United States Patent [19]

DeLorme et al.

[11] Patent Number: 4,819,156

[45] Date of Patent: Apr. 4, 1989

[54] DATABASE INDEX JOURNALING FOR ENHANCED RECOVERY

[75] Inventors: Dennis S. DeLorme; Mark L. Holm; Wilson D. Lee; Peter B. Passe; Gary R. Ricard; George D. Timms, Jr.; Larry W. Youngren, all of Rochester, Minn.

[73] Assignee: International Business Machines Corporation, Armonk, N.Y.

[21] Appl. No.: 874,316

[22] Filed: Jun. 13, 1986

[51] Int. Cl.$^4$ ............................................. G06F 1/00
[52] U.S. Cl. ..................................... 364/200; 364/300
[58] Field of Search ... 364/200 MS File, 900 MS File, 364/300

[56] References Cited

U.S. PATENT DOCUMENTS 4,507,751 3/1985 Gawlick et al. .................. 364/900
4,638,426 1/1987 Chang et al. ..................... 364/200

OTHER PUBLICATIONS

Haerder, "Principles of Transaction-Oriented Database Recovery" Computing Surveys, vol. 15, No. 4, Dec., 1983, pp. 287–317.

Gray, "The Recovery Manager of the System R Database Manager" Computing Surveys, vol. 13, No. 2, Jun., 1981, pp. 223–242.

Verhofstad, "Recovery Techniques for Database Systems" Computing Surveys, vol. 10, No. 2, Jun., 1978, pp. 167–195.

Primary Examiner—Raufe B. Zache
Attorney, Agent, or Firm—Bradley A. Forrest

[57] ABSTRACT

A quick recovery of logical files which provide alternate views of databases is provided. Unchanged logical file pages are journaled before being changed. Transactions affecting databases covered by the logical files are also journaled. To recover a logical file, the journaled unchanged pages of the logical file that correspond to the changed pages are inserted back into the logical file, and the transactions that were journaled are processed to provide the changes to the logical file and to the database. This brings the logical file and the underlying database up to date, and in synchronization with each other.

14 Claims, 16 Drawing Sheets

DATABASE INDEX JOURNALING FOR ENHANCED RECOVERY

BACKGROUND OF THE INVENTION

The invention relates to computer system recovery, and in particular to synchronization of database indexes to the data spaces which they cover.

Databases may be comprised of data spaces that contain data space entries, or records, and database indexes that provide ordered lists of data space entries, based on key values contained in the data space entries. When changes are made to the entries in a data space(s), database indexes over the data space may need to be updated, in order to keep the indexes synchronized with respect to the data space they cover. In the IBM System/38, the changes to the database index(es) are made first, followed by the changes to the data space. This order of changes is chosen to allow any conditions that would prevent the updating of the database indexes to surface before a data space is changed. The attempt to insert a duplicate key into a unique index is one such condition.

When the system terminates abnormally, the data spaces and the database indexes relating thereto may not be synchronized. Some transactions may have caused database index(es) to be updated, but the associated data space entries may not have been updated at the time the system terminated. To further complicate matters, in a virtual storage environment with paging, the paging routine may not have written the changed pages for either the data space or the associated database index(es) to nonvolatile storage, or it may have only written some of the changed pages for either the data space or the database index(es) to nonvolatile storage at the time of a failure. If some, but not all, of the changed pages for a database index were written to nonvolatile storage before an abnormal termination, the logical structure of the index that is available from nonvolatile storage after termination may be sufficiently inconsistent so as to preclude use of the index, even as a starting point for forward recovery (using a journal of data space entry changes).

Journaling of transactions which cause a change in a database is a well known technique, and is described in detail in the following references: U.S. Pat. No. 4,507,751 to Gawlick et al., Haerder, "Principles of Transaction-Oriented Recovery", Computing Surveys, Vol. 15, No. 4 Dec. 1983, Verhofstad, "Recovery Techniques for Database Systems", Computing Surveys, Vol. 10, No. 2, June 1978, and Gray, "The Recovery Manager of the System R Database Manager", Computing Surveys, Vol. 13, No. 2, June 1981. These references do not address efficient recovery of database indexes relating to data spaces.

Journaling transactions to a database works well for recovery of the data space, because it is only necessary to journal the image of each data space entry before and after each change. Each data space entry is localized at a fixed position within the data space, so few pages are changed when a data space entry is updated.

Journaling the changes to the database indexes relating to a data space is more complex because, depending on the type of data structure used for the index, a change to a single entry in an index may require changes to many logical pages in the index. Many popular index structures, such as binary radix trees and B-trees, exhibit the characteristic that a change to a single entry can require changes distributed through many logical pages of the index. An approach of journaling all changes to a database index may require so many pages to be journaled for each change of a data space entry that the technique cannot be used because of the very large storage requirements for the journal or because the performance cost of the required journal activity may be prohibitive.

The most straight-forward approach to recovering database indexes following a failure, where the state of indexes is uncertain, is to read every entry in every data space covered by each database index, and rebuild the entire index from the data space entries. This process can be extremely time-consuming, because of the number of auxiliary storage I/O operations and index operations required. In some cases, the time required to recover the database indexes over one or more large data spaces is measured in terms of days.

SUMMARY OF THE INVENTION

A quick recovery of a database index is provided by journaling unchanged index pages (once) before the pages are changed for the first time, and also journaling transactions consisting of the changed and unchanged images of data space entries for all data spaces covered by the index.

To recover the database index, the index is first restored to its original state by copying the image of the unchanged pages from the journal to the index. The index is then updated by re-processing the index changes associated with all journaled changes for entries in the data space(s) covered by the index. The unchanged image of each data space entry is required to locate the associated entry in the original database index. The changed data space entry image is used to provide the updated index entry information, and also to recover the data space by copying the changed entry from the journal to the data space (for all changed data space entries that may not have been written to nonvolatile storage before the termination). After these operations are completed, the database index and the data space are both up to date, and the database index is synchronized with the data space(s) it covers.

DETAILED DESCRIPTION

Figure 1:
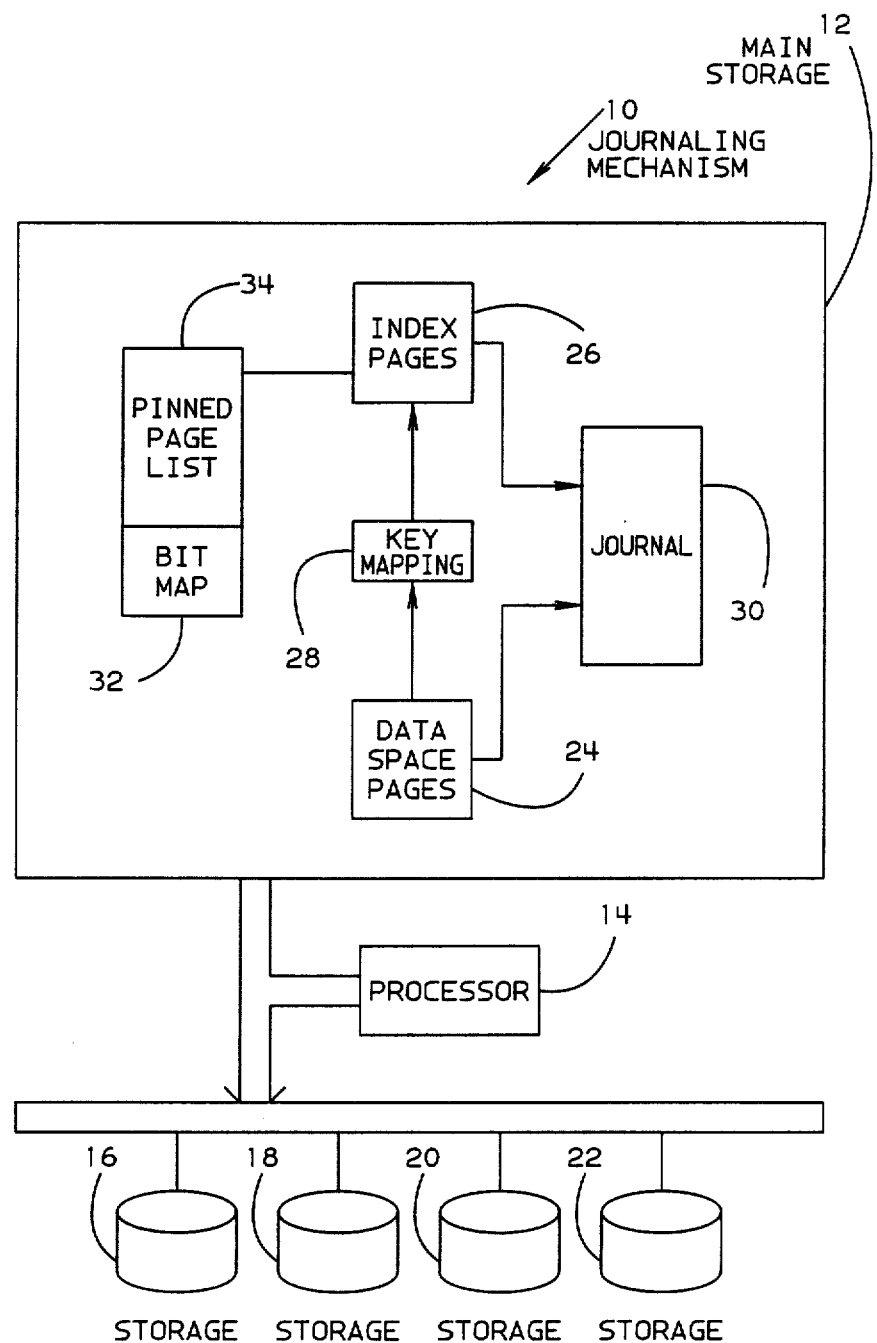
FIG. 1 is a block diagram of areas used in main storage to accomplish the journaling of logical files in accordance with the present invention.

In the preferred embodiment, the database indexes comprise binary radix tree indexes defined over data spaces. Journaling of unchanged index pages is also beneficial with other implementations of database indexes, such as B-Trees. A write-ahead journal is used to reflect all changes to a data space before the data space entries are actually changed. Changed index pages are not allowed to be written to auxiliary storage until their corresponding unchanged page images have been written to a journal on auxiliary storage. Thus, the journal on auxiliary storage always contains information that corresponds to the most recent changes to the journaled database indexes and data spaces, even before the indexes and data spaces are changed on auxiliary storage.

In a further preferred embodiment, the unchanged database index pages are copied to a buffer in main storage before they are written to the journal on auxiliary storage. The buffer in main storage is not forced to be written to auxiliary storage until all unchanged database index pages and the changed and unchanged data space entry changes are added to the buffer. Allowing the journal information to accumulate in a main storage buffer reduces the number of I/O operations necessary to write the information to auxiliary storage, which can improve performance. Because this procedure allows the database index pages to be changed in main storage before the unchanged index pages are written to the journal on auxiliary storage, it is necessary to provide a mechanism to make sure that the write operation(s) for the journal are completed before the write operation(s) for the database index(es) are initiated.

In the preferred embodiment, the database indexes, data spaces, and journal reside on pages in a virtual storage environment. When a page from virtual storage is pinned in mainstore, the storage management mechanism of the system is not allowed to write the page to auxiliary storage or to re-assign the mainstore page frame to a different virtual page. The write operations to auxiliary storage are ordered by pinning any pages in a database index from just before the page is changed for the first time (in main storage) until after the unchanged page image is written to the journal on auxiliary storage. Other mechanisms are possible to ensure that the journal is updated before the database index on auxiliary storage, and such mechanisms are considered to be within the scope of this invention.

A journal sync point is a marker, or pointer, which is associated with a particular journaled database index or data space, and which identifies the oldest entry in the journal that is needed to recover the associated journaled object after an abnormal termination. Each journaled database index and data space has its own sync point. The sync point can be viewed as the position in the journal that corresponds to the last (most recent) time when the state of the journaled database index or data space on auxiliary storage was known to be at a completely reliable and consistent state. The sync point for a journaled object is updated to reference a different journal entry whenever all pending changes for the object (database index or data space) are forced to be written from main storage to auxiliary storage.

The recovery of a journaled database index after an abnormal termination relies on the ability to return the index to some completely consistent state, and then re-processes changes to bring the index up to date with respect to the data spaces it covers. Since the journal sync point for a database index identifies a point where the index is in a consistent state, the recovery process needs to restore the state of the index at the time when the associated journal sync point was last updated. In order to return the index to its state at the last sync point, the journal must contain at least the unchanged images of every database index page that was changed in response to a change in one of the data spaces the index covers.

In the preferred embodiment, only the images of unchanged database index pages are saved in the journal. Once the image of an unchanged page in a database index has been added to the journal, no additional journal entries are required for that page until after the next sync point update, regardless of how many times an individual page is updated. Thus, if multiple changes occur between sync point updates to the same pages of the database index, there is no need to gather and save the contents of index pages that may contain complex and redundant changes. Other techniques are possible, such as saving the image of every database index page before every change. The preferred embodiment reduces the number of auxiliary storage I/O operations and the amount of auxiliary storage required, if multiple changes are made between sync point updates to the same database index page(s).

A mechanism is required to record which index pages remain unchanged since the last sync point, and which pages have had their unchanged images journaled before they were changed. In the preferred embodiment, a bit map is associated with the database index to determine which pages have been journaled and changed since the last sync point update. Each bit in the map represents a single logical page in the index, and there is a separate bit map for each journaled database index. All the bits in the map for a journaled index are cleared (set to zero) when the index sync point is updated. The unchanged image of a database index page that has not been changed since the last sync point update is called a "virgin" page image. Before a page in the index is changed, the corresponding bit is tested to determine whether the page is still a virgin page. If the bit is reset (zero), the virgin image of the page is added to the journal, the bit is set (to one), the page is pinned in mainstore, and then the page is changed. If the bit is already set (to one) when a page must be changed, the page is just updated (without journaling or pinning it in mainstore). Other techniques are possible to distinguish between virgin pages and index pages that have been changed since the last sync point.

In a further preferred embodiment, a list of all the database index pages that are currently pinned is updated to add an entry every time an index page is pinned (before it is updated in main storage). After unchanged and changed images of the associated data space entry are added to the journal and the journal is forced to be written to auxiliary storage, all the pages in the list are unpinned (which allows the pages to be written by the system storage management means to auxiliary storage), and all entries are removed from the list of pinned pages.

The journal sync point for a database index is updated occasionally, in order to limit the number of journal entries that must be used to recover after an abnormal termination. The more journal entries allowed between sync point updates for database indexes, the more journal entries that may need to be read from auxiliary storage and processed after an abnormal termination, and the longer recovery may take. In the preferred embodiment, a parameter is provided to allow the database user to control how frequently the sync points for database indexes are updated.

To recover database indexes and data spaces, the appropriate journal entries appearing after sync points for each object are applied to the indexes and data spaces. The sync points for indexes need not be the same as for data spaces. This is beneficial because it allows the system to avoid writing to auxiliary storage, at the same time, all the changed pages for database indexes and the data spaces they cover. The I/O operations required to write multiple objects to auxiliary storage could have severe performance impacts on the rest of the system. All objects in the set of database indexes and the data spaces they cover need not be synchronized (written to auxiliary storage) in unison in order to synchronize any one object.

To recover a data space or index, the entries on the journal (generated by transactions against the database being journaled) since the latest sync point for each object, are applied to the appropriate data space or index. The first step is to apply all journaled virgin images to the database index, to return the index to the consistent state that existed for the last sync point. The next step is to apply all journaled changes to the data space(s), and to record index changes that will be required to bring the database index(es) up to date. The final step is to apply the recorded changes to the index, which updates the index from its state at the last sync point to the state that corresponds with the last (newest) entry in the journal.

The preferred embodiment performs the first two steps in a single pass that reads and processes journal entries. The index is not restored to its state at the last sync point until all journaled virgin page images are processed, but the recording technique allows the system to defer referencing the index to update, remove, or change entries until it is completely restored to its state at the last sync point.

When a large number of pages in an index are to be changed in a given transaction, a clone, or duplicate of the index is made on auxiliary storage to avoid clogging the journal. An entry is added to the journal and the sync point for the index is updated when the clone is created. In this case, it is not necessary to write the original database index to auxiliary storage when the sync point is updated. Instead, the clone is written to auxiliary storage. If an abnormal termination occurs, the clone is used to restore the index to its state at the last sync point. Recovery then proceeds in the same manner described above, after the index state at the last sync point is restored from the close. The clone is destroyed when the transaction is completed.

One example of an operation which would benefit from a cloning approach is when all the entries in a data space must be physically reorganized (re-ordered). This operation requires that each key in the data base index be changed to reflect the new location of each record. Cloning provides a method of capturing the virgin images before reorganization without journaling each change as it occurs.

PREFERRED EMBODIMENT

A database index journaling mechanism is indicated generally at 10 in FIG. 1. The mechanism 10 comprises a main storage area 12 for storing pages of data. In the preferred embodiment the pages of data comprise 512 byte pages of data which are paged in and out of volatile main storage 12 by a processor 14 which implements well known paging routines. The pages are stored on nonvolatile auxiliary storage units 16, 18, 20, and 22, which are usually disk drive devices.

The data residing in main storage 12 and on disk drives 16-22 comprises a plurality of databases, consisting of a combination of data spaces and logical files. The logical files, implemented as indexes in the preferred embodiment provide different views of the data spaces. Data spaces and logical files are also both referred to as objects. Data space pages residing in main storage 12 are represented at 24. While shown pictorally in one block, physically they reside in multiple pages of main storage 12. Similarly, index pages represented by block 26 span multiple pages of main storage.

The index pages 26 contain keys relating to data on data space pages 24. The keys are organized in a binary radix tree in the preferred embodiment. Several examples of the keys will be illustrated below. Further information on keys and binary radix trees is found in Howard and Borgendale, "System/38 Machine Indexing Support", IBM System/38 Technical Developments, 1978. (IBM Form G580-0237) Mapping between the data space pages 24 and the index pages 26 is provided by a key mapping block 28 which contains information necessary to transform data from a record in the data space into a corresponding key in the index.

Copies of changes to be made to the data space pages are buffered in a journal buffer 30. The journaled changes in the buffer are written out to auxiliary storage 16-22 prior to the changes being made on the data space pages. This is commonly known as a write-ahead journal.

Whenever a journaled data space is forced (forced to be written to auxiliary storage in its entirety), a sync point is marked on the journal for that data space. A sync point is a marker representing a point in time at which all previously altered pages of the journaled object have been written from volatile main storage to non-volatile auxiliary store.

Each time a new sync point is established the recovery processing mechanism can limit processing time by ignoring previous journaled deposits on behalf of the synchronized object. Consequently, this mechanism ensures that recent changes to the data space pages can be recovered in the event of system termination by merely employing the journaled images recorded subsequent to the sync point.

In addition to journaling the changes to the data space pages, a copy of index pages to be changed is journaled prior to changing the index pages. Pages to be changed are identified as follows. Every index operation that changes an index (either an insert or remove) provides a key to be inserted or deleted. This key is used to search the index to find the point of change in the index. Thus after an initial search of the index, the page(s) which change in response to a data space change are located. Journaling the changes is accomplished by sending the page image to the journal if it is a virgin image.

The fact that an index page has been journaled is indicated in a bit map 32 which contains a separate distinct bit position for each index page. If more changes are to be made to the index page before a sync point occurs for the index page, the corresponding bit position in the bit map 32 is examined. If the bit is on, the index changes are made without journaling the index page again.

Changed index pages not already journaled since the last sync point are pinned and tracked in a pinned page list 34. The page is pinned before the virgin index page is sent to journal buffer 30. The presence of this pin prevents this page from being written out by normal virtual memory paging functions. After the page is sent to the journal buffer 30, the changes to the index pages are made.

The changes to the data spaces are reflected on the journal buffer 30 and are then written synchronously via a storage management function to auxiliary storage. The virgin index pages are also written at the same time. They piggyback out to auxiliary storage with the changes to the data spaces. Thus, both varieties of journal deposits are bundled into a single packet of bytes, hence there is no extra I/O operation required to journal the index other than that required to journal the data space alone.

The pins on the now changed virgin index pages are pulled (the pinned page list 34 is used to identify these pages), via a request to storage management. This allows the altered index page images to again participate in normal paging activity. The pages are also removed from the pinned page list 34. The changes to the data spaces are also made following the synchronous write of the journal buffer. The above order is important in that it ensures that any time the system crashes with loss of main storage content, the data spaces and indexes can be reconstructed purely from images resident on the journal.

Periodically objects being journaled are synchronized. A selection mechanism forces the object with the oldest (earliest) sync point to auxliary storage every n journal entries. n is a value selected to strike a balance between recovery time and performance overhead accompanying the sync point mechanism. It is referred to as a recovery constant.

Synchronization of the oldest object serves to limit the length of the recovery time by ensuring that during recovery (after a machine failure) the journal need not be processed further back than the final n entries residing on the journal. The recovery constant insures that no object has a sync point more than n entries from the end of the journal.

The above description of the embodiment is described in FIG. 6.

In the case of data base manipulations which require massive data changes (those likely to impact the vast majority of pages in the index), it is not desirable to journal every virgin index page affected by the manipulations, since doing so would dramatically increase the rate of making journal deposits. Operations of this sort require the alteration of practically every page in any index overlying the data base and, consequently, would require the journaling of all these virgin pages. If the indexes involved are large, the journal could rapidly become extremely large as well. Instead, all journaled indexes that will be affected by the operation are totally replicated (cloned) prior to starting the operation and a single entry containing a pointer to the clone is placed on the journal.

Figure 2:
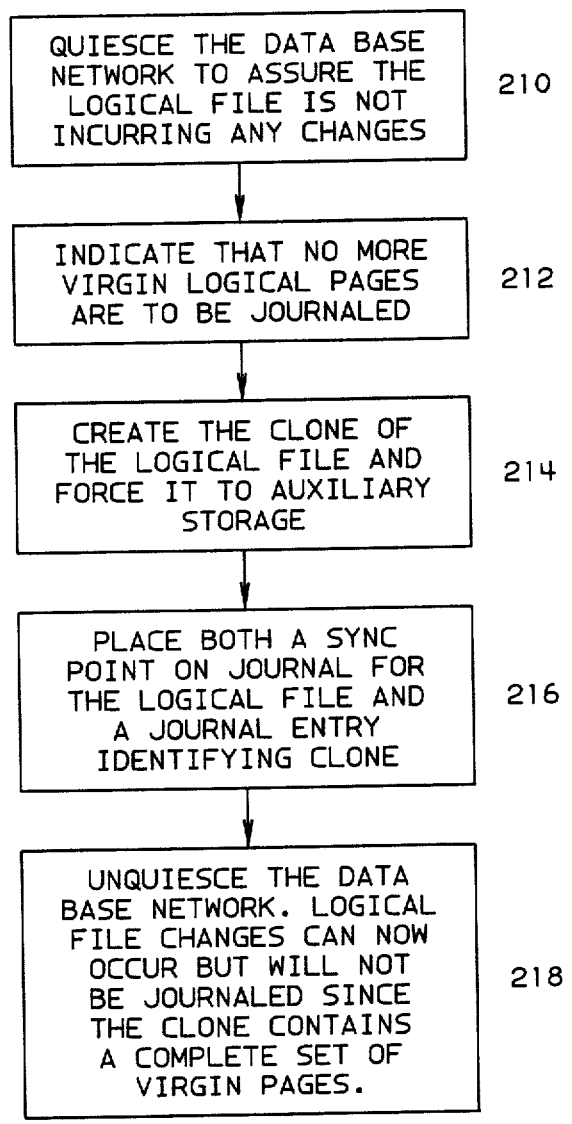
FIG. 2 is a general flow diagram of the steps required to produce a clone of the logical file.

The actual cloning process involves the following steps as indicated in FIG. 2. At 210, the data base network is quiesced; seizes (indications prohibiting use by another process) are acquired to prohibit any index changes so that a consistent view of the index and the underlying data base pages is obtained for the cloning process. Since a clone is about to be made of the entire index (thereby capturing all the virgin images) there is no longer a need to subsequently journal the virgin pages affected by an index change. The index is marked to indicate that it need no longer journal its virgin pages as shown at 212. The marking is similar to the function provided by bit map 32 in FIG. 1.

The database index clone is created and forced to auxiliary storage at 214. Box 216 places a sync point on the journal and produces a journal entry which identifies the clone. Box 218 releases any seizes acquired at box 210 and allows changes to occur on the index once again.

If recovery actually becomes necessary, the index clone referenced from the journal replaces the original index. Recovery then proceeds exactly as that for logicals with journaled virgin pages; any data base key alterations are placed in a log and applied to the index.

Upon machine failure, the sync point for a data space identifies the starting point for recovery. For data spaces, all AFTER-images journaled after the last checkpoint (synch point) are applied to the file. Before data space indexes (DSIs) are recovered, an area called a log is created for the index. All keys removed or added during recovery processing are deposited in this log rather than directly updating the binary radix tree. Once recovery is complete, these logged changes are applied to the tree structure of the index. This logging mechanism, which refrains from altering the binary radix tree directly, allows recovery to be restartable, that is, to be tolerant of a machine failure during the recovery operations themselves.

For data space indexes, three types of journal entries are applied to the binary radix tree. All entries residing beyond the index's sync point are examined to determine if they are before images for a data space entry (DSE), after images for a DSE, or virgin index page images. Virgin index page images encountered on the journal, however, are applied directly to the tree rather than to the loggin area. Keys constructed from all before images are identified as keys to be eventually removed from the tree. However, rather than being applied directly to the tree, these keys are deposited in the logging area. Simiarly, keys derived from the after-images of the DSE are logged as well and scheduled to be eventually inserted into the tree.

When an after image of a DSE is encountered on the journal and this journal entry is more recent than the data space's sync point, as determined by comparing the sequence number of the journal entry to be applied with the sync point of the data space, the journal entry is applied directly to the data space.

If there are any journaled indexes over the data space, and the data space entry is equal to or greater than the sync point of any of the indexes, the appropriate key image for the index is logged by depositing a key image in a separate special container in main store belonging to the index. This container, known as a logging area, serves as a collection point for pending key changes.

If the journal entry is a virgin index page image, it is applied directly to the binary radix tree. Information is contained in each such journal entry identifying which page of the binary tree is to be affected. For a clone entry on the journal, recovery consists of replacing the entire binary radix tree with its clone.

Since key changes are saved in the logging area as they are encountered, only one pass through the journal is necessary. The index is rolled back and key change information necessary to synchronize it with its data space is obtained by looking at the journal only once. This single pass approach saves time on recovery procedures.

FIGS. 7a–d describe the above description of recovery of indexes and data spaces.

At this point only one recovery step remains. To bring the index up to date with its data spaces, the key changes logged with the index must be applied to the tree. During this phase, a data base function takes the logged key changes and inserts them into the recovered index. This is known as "catching up" the index. Once the index has been caught up it is once again in perfect synchronization with the contents of the underlying data spaces.

Figure 3:
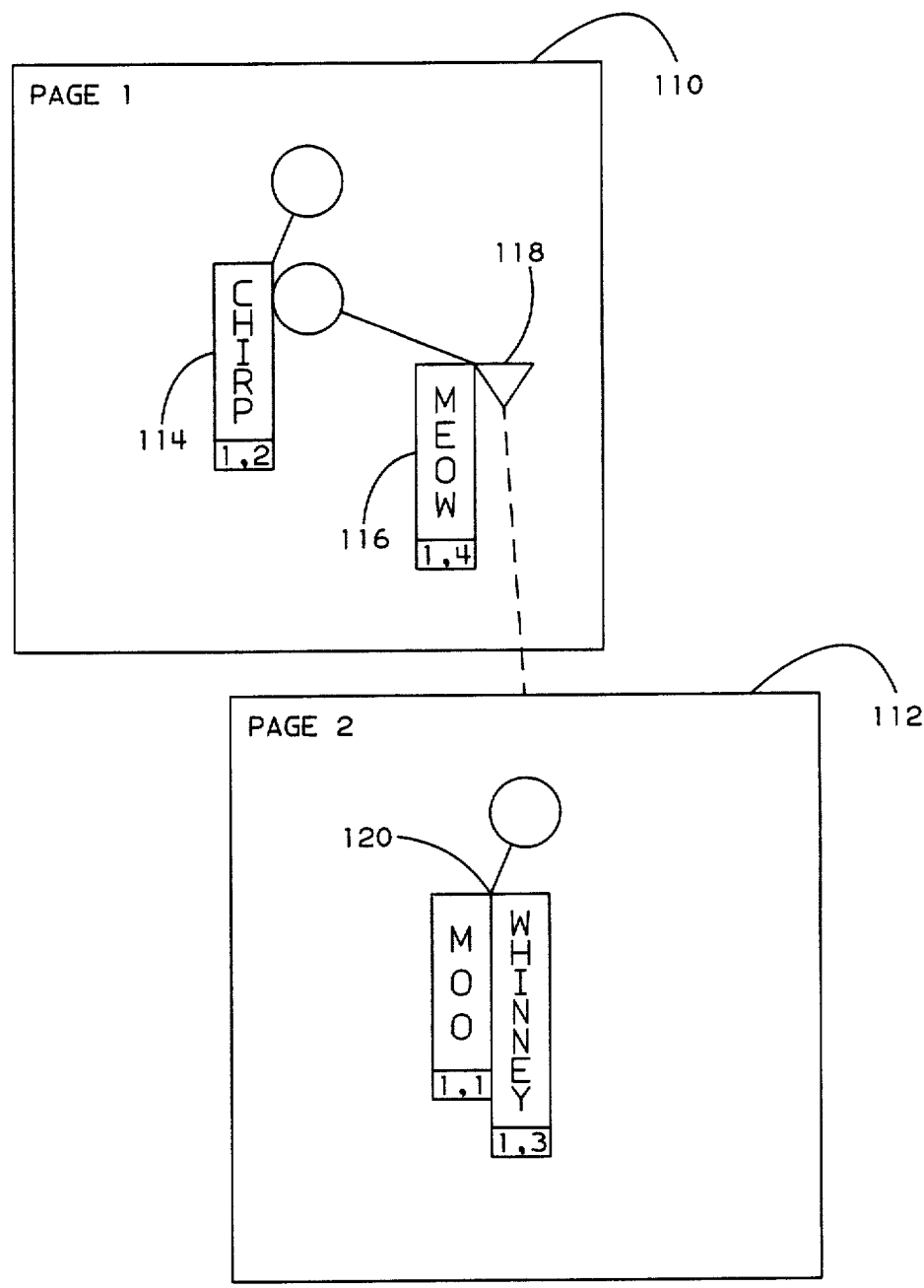
FIGS. 3-5 depict pages of an index used in describing the journaling function of FIG. 1 and FIG. 2.
Figure 4:
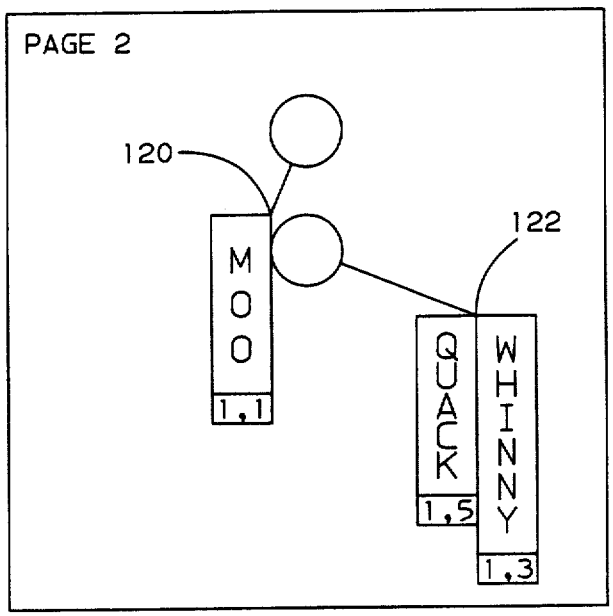
Figure 5:
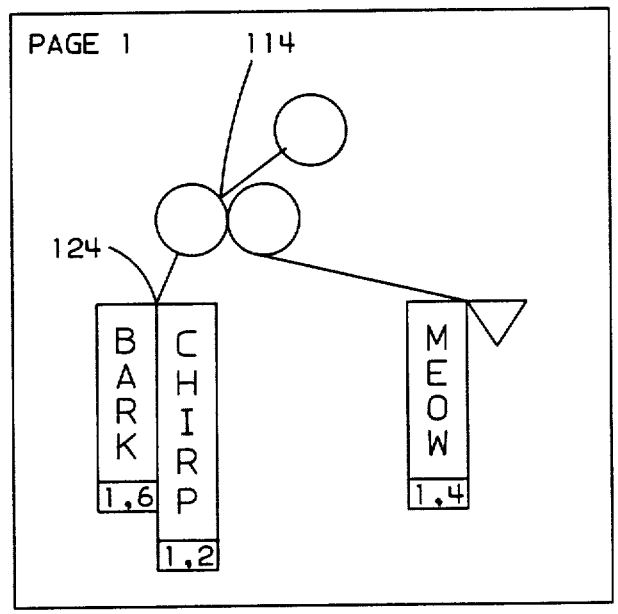
Figure 6A:
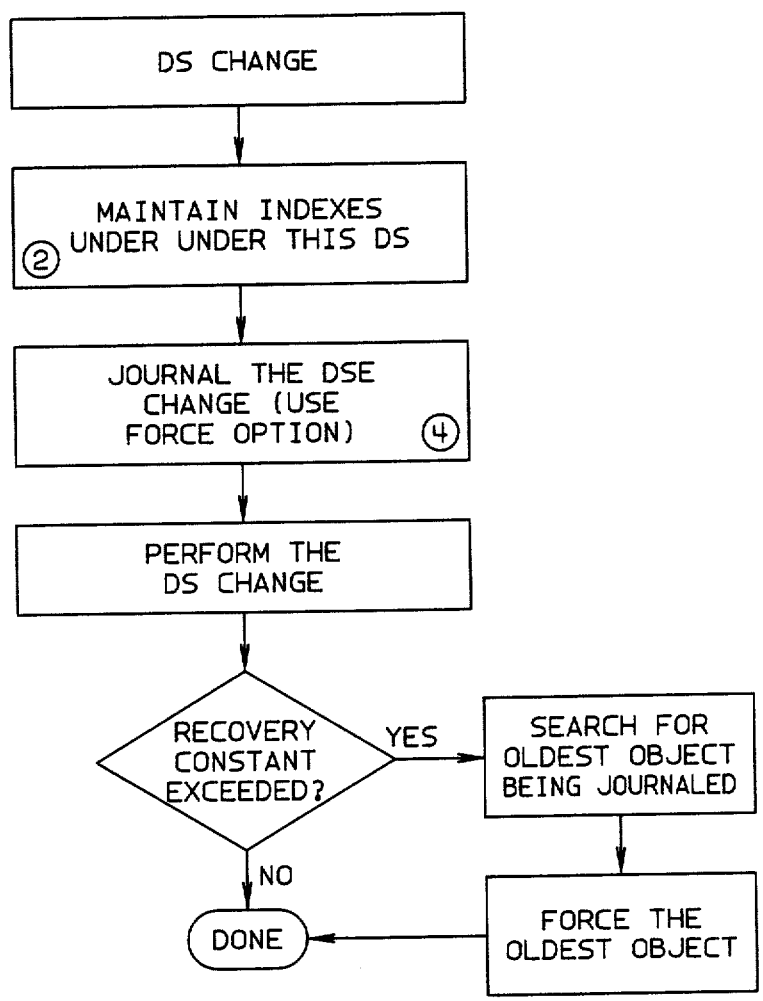
FIGS. 6a-f are a general flow diagram of the index journaling of FIG. 1.
Figure 6B:
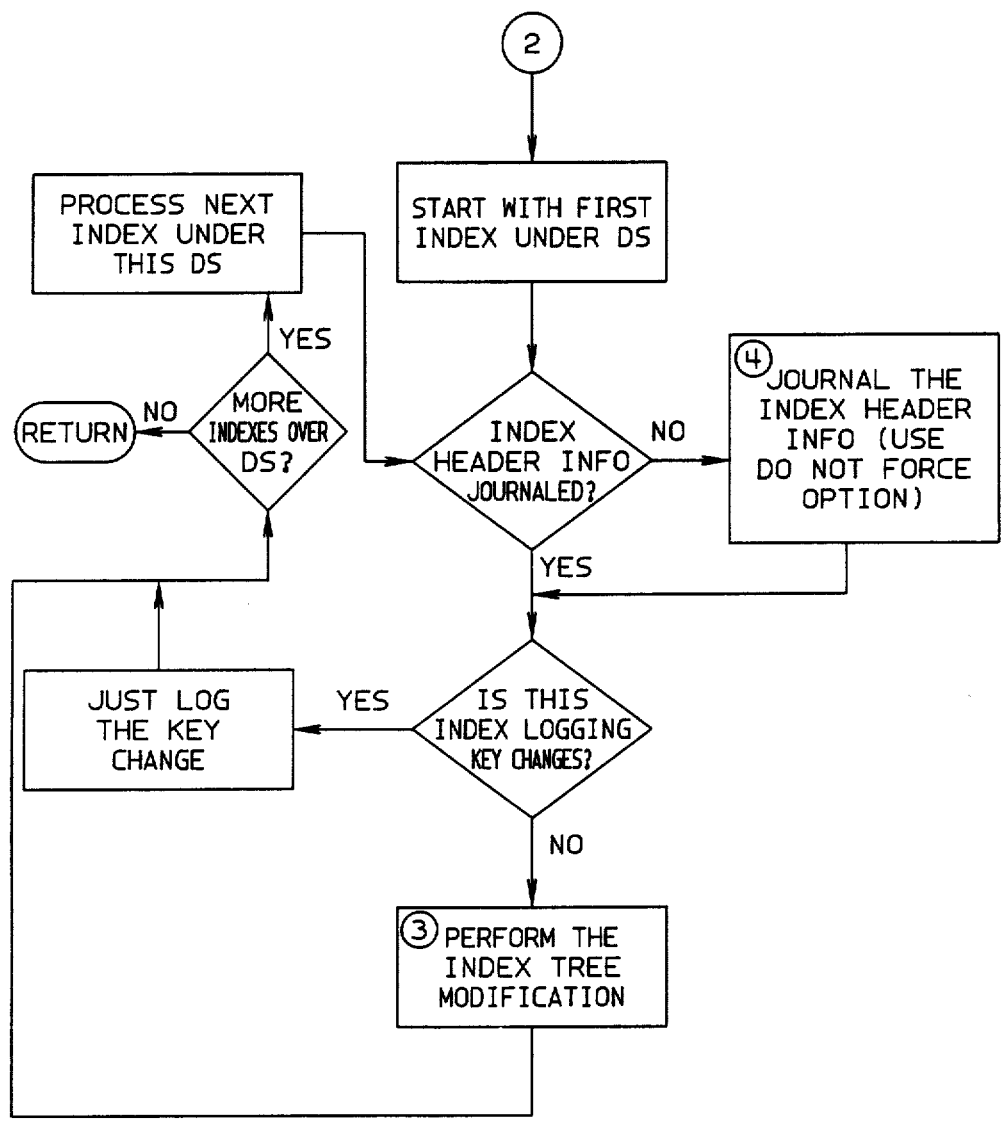
Figure 6C:
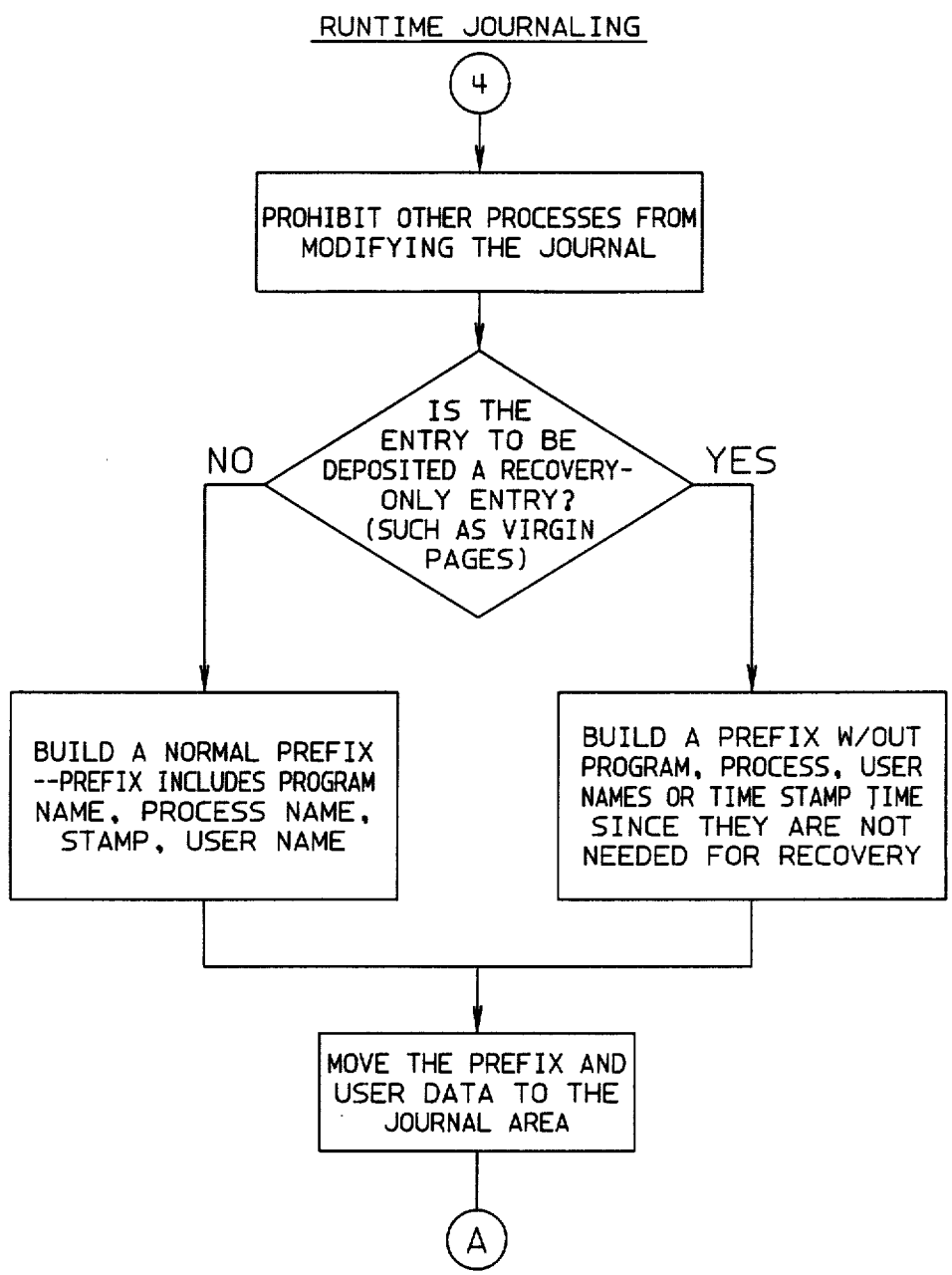
Figure 6D:
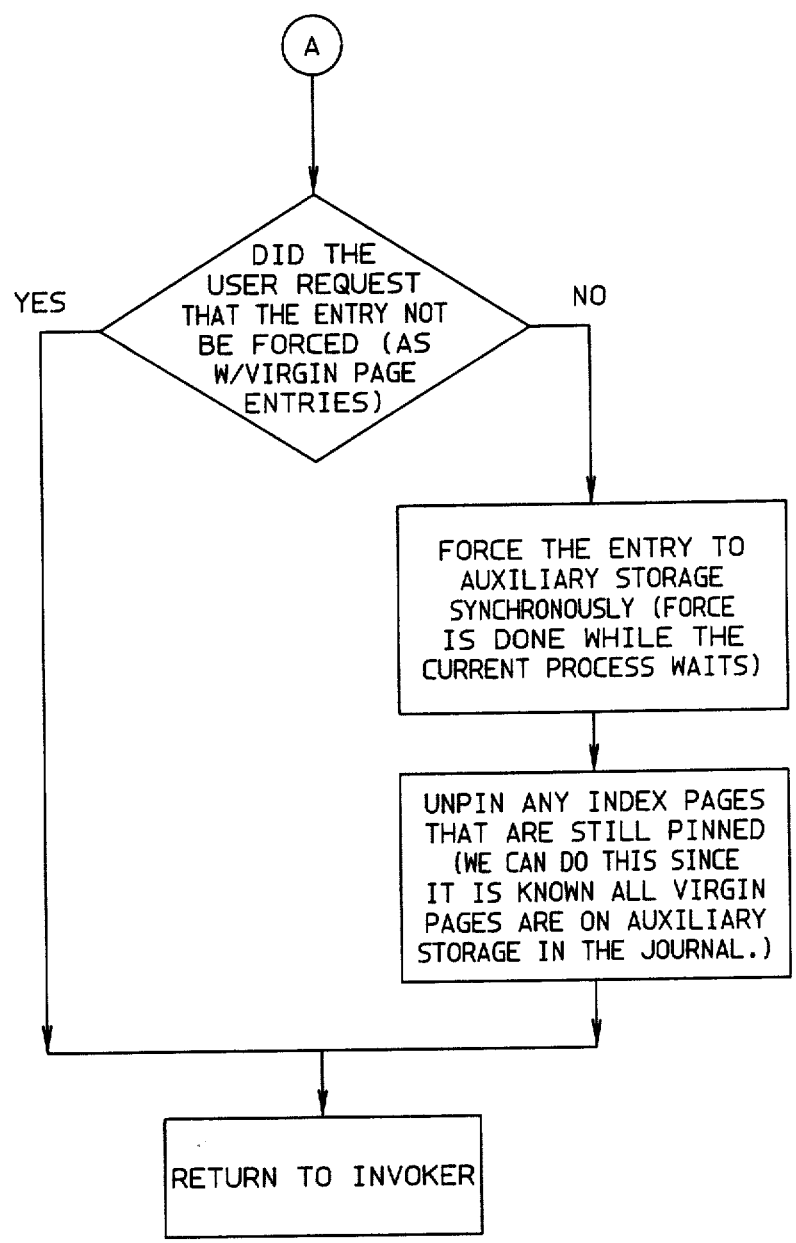
Figure 6E:
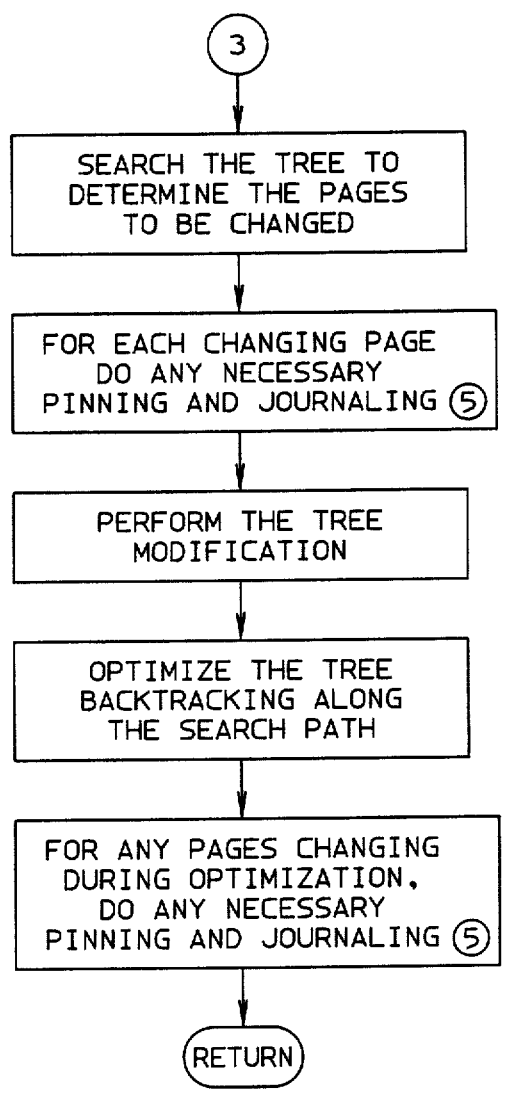
Figure 6F:
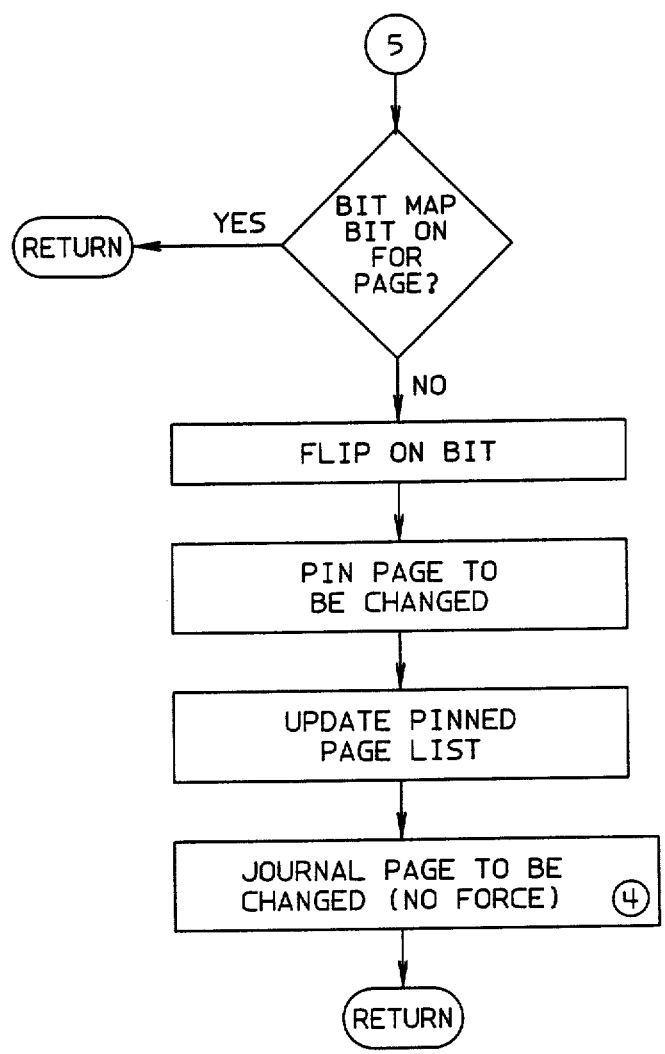
Figure 7A:
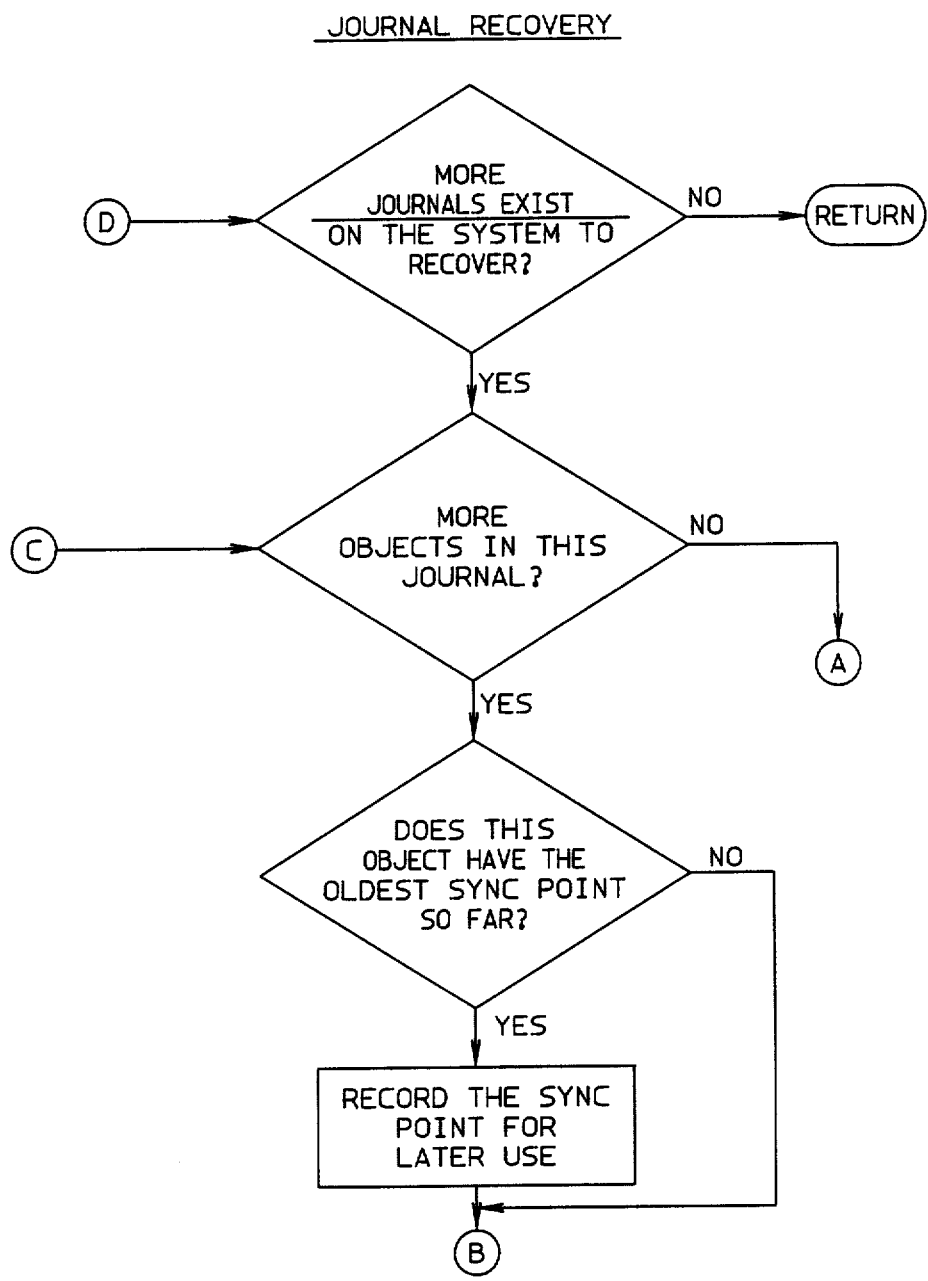
FIGS. 7a-d are a flow diagram for recovering indexes and data spaces.
Figure 7B:
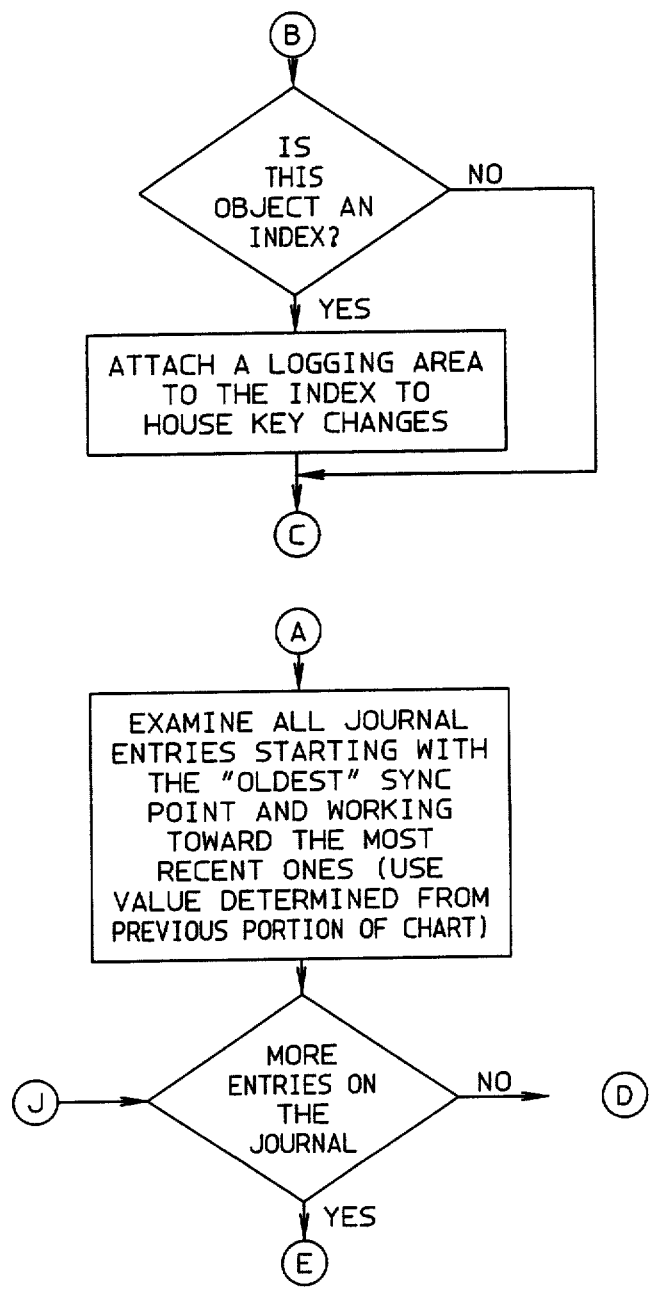
Figure 7C:
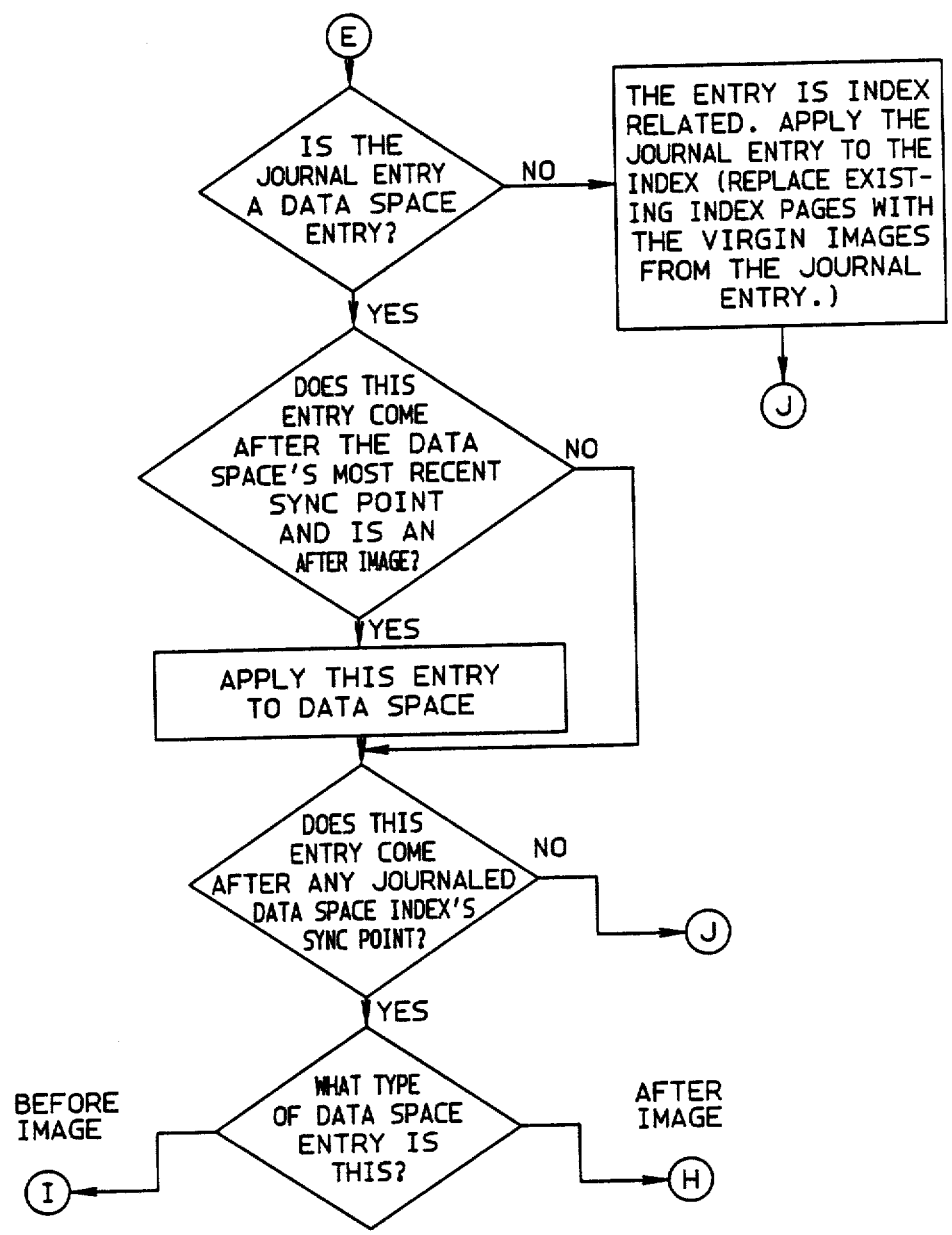
Figure 7D:
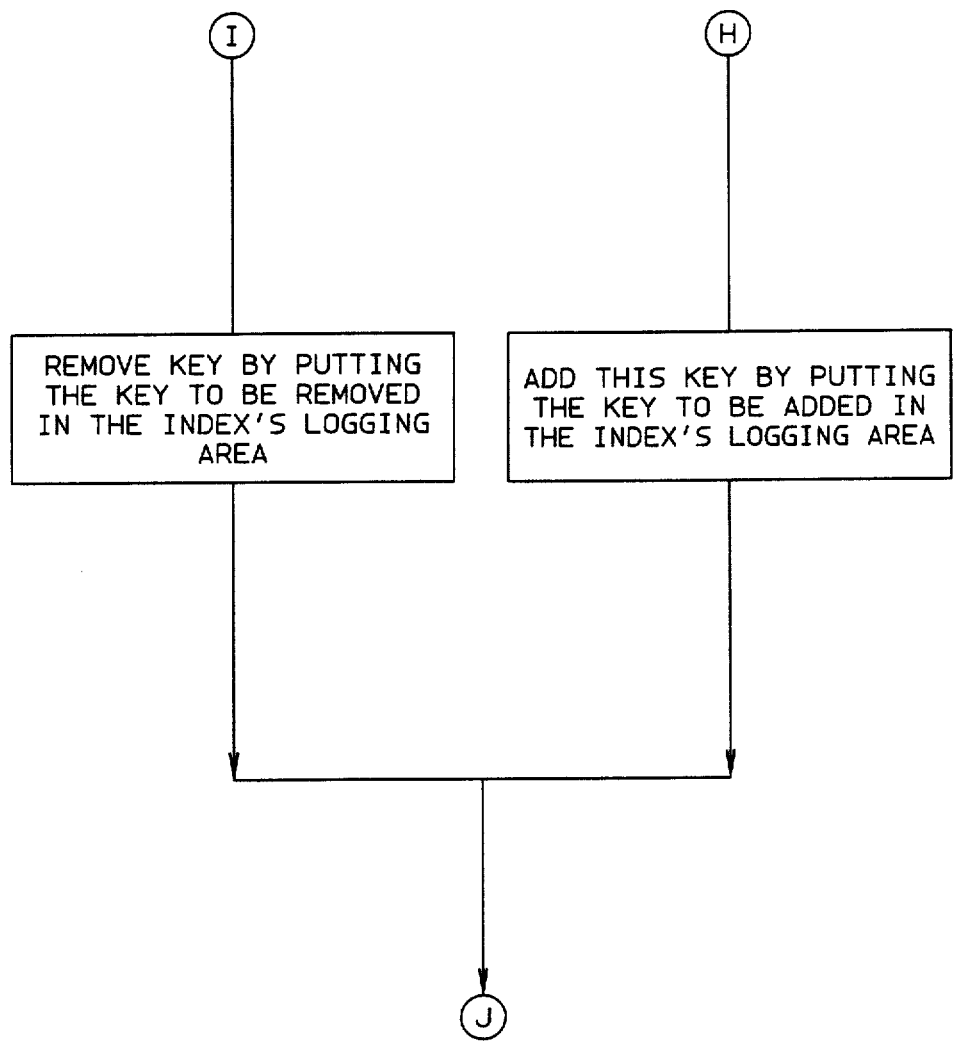

A simple example of selected pages of an index is shown in FIGS. 3–5. Decision nodes represented by circles define the direction (i.e., to the right or to the left) in which a search should proceed. Each decision node contains forward and backward linkage information. They also contain information defining the type of node, and identify a compare bit which is tested in the desired key to provide search direction (e.g., if the bit is zero, the search proceeds left; if the bit is one, the search proceeds right). Page pointers, represented by triangles, contain a pointer to the next page in a search path. When a page pointer is encountered, if the page it addresses is not resident in fast access or main storage, the reference page must be brought (retrieved) from auxiliary storage into main storage. Terminal text elements represented by rectangles contain the remaining part of an entry or key stored in the index. A cluster is defined as any two elements, such as two nodes, or a node and a page pointer, or terminal text and a node to name a few possibilities. A page 1 indicated at 110 and a page 2 indicated at 112 in FIG. 3 are index pages containing entries corresponding to a data space record having a definition of:

| animal:sound |
| --- |
| field 1:field 2 |

The data space is referred to as data space number 1, and has four entries:

| ordinal number | field 1 | field 2 |
| --- | --- | --- |
| 1 | cow | moo |
| 2 | sparrow | chirp |
| 3 | horse | whinney |
| 4 | cat | meow | where the ordinal number is the relative position of the data space entry in the data space. The relative address is defined by the data space number and the ordinal number assigned to the entry of interest in that data space. The record chirp has a relative address of 1,2 corresponding to the data space number, and the ordinal number respectively. Field 2 is the key field.

The record meow has a relative address of 1,4; moo, 1,1; and whinney, 1,3. In FIG. 3 on page 1, the index key corresponding to the second data space entry is indicated at a cluster 114 with its relative address encoded at the tail of the index entry. Meow is located at a cluster 116 on page one. Cluster 116 also has a page pointer 118 pointing to page 2 at 112.

The records moo and whinney are both located at a node 120 on page 2.

If journaling of data space 1 had started just before records 3 and 4 has been inserted into the data space, the journal would contain the following entries for records 3 and 4.

| Journal: Entry number | |
| --- | --- |
| 1 | |
| . | |
| . | |
| 16 | Data Space entry type, data space address and ordinal number 3 "horse whinney" |
| 17 | Data space entry type, data space address and ordinal number 4 "cat meow" |

The sync point for data space 1 is journal entry number 16.

For an index journaling example, journaling of the data space index is started after data space entry number 4 had been inserted in the data space. Since there are no entries for the data space index yet, its sync point is zero. This means the index is in sync with the journal.

Two data space entries are to be inserted into the data space:

| entry 5: | duck | quack |
| --- | --- | --- |
| entry 6: | dog | bark |

Index page 2 will be changed by the data space entry "duck quack" as indicated in FIG. 4 for the first entry. FIG. 4 is numbered consistently with FIG. 3. The page is first journaled and pinned, since the bit corresponding to this page in the bit map is zero. The journal now contains:

| 16 | *same as before* |
| --- | --- |
| 17 | *same as before* |
| 18 | Index entry type data space index address, index internal header(s) information |
| 19 | Index entry type, data space index address, relative index page address Page 2 data FIG. 3 112. (virgin image) |

The sync point for the data space index is now entry number 18. The bit map is updated for the index page 2 just journaled. The bit map becomes: 010000 ... 0. Note that the first bit position of the map corresponds to the first page of the index 110. The second bit position corresponds to the second page of the index 112. Index page 2 is put on the pinned page list for the data space index. The pinned page list consists of an area used to address the pages currently pinned.

The data space index is then changed. Note that a new cluster (FIG. 4) is created which contains both the records quack and whinney. Cluster 120 now contains a node which points to node 122. Once all index changes are complete, the data space change is journaled as journal entry number 20. The journal now contains the following entries:

| 16 | *same as before* |
| --- | --- |
| 17 | *same as before* |
| | Journal Force Point (sync point for data space index) |
| 18 | *same as before* |
| 19 | *same as before* |
| 20 | Data space entry type, data space address, |

| ordinal number 5 |
|---|
| "duck quack" |

All journal entries since the force point following entry number 17 are written to auxiliary storage when entry number 20 is made. The pins are pulled from all the pages referenced in the pinned page list of the data space index, since it is known that the journal entries corresponding to the pinned pages have been forced to auxiliary storage. In this example, the pin is pulled on page 2 (FIG. 4 112) of the index.

The changes to the data space are then made. The data space now contains:

| ordinal number | field 1 | field 2 |
|---|---|---|
| 1 | cow | moo |
| 2 | sparrow | chirp |
| 3 | horse | whinney |
| 4 | cat | meow |
| 5 | duck | quack |

When the data space entry, "dog bark" is inserted into the data space, the key "bark" affects page 1 (FIG. 3 110) in the data space index. Page 1 is journaled and pinned. The journal now contains:

| 16 | *same as before* |
|---|---|
| 17 | *same as before* |
| 18 | *same as before* |
| 19 | *same as before* |
| 20 | *same as before* |
| 21 | Index entry type, data space index address, relative index page address, Page 1 data FIG. 3 110 (virgin page image) |

The bit map is updated to read 1100000 ... 0. Page 1 is put on the pinned page list for the data space index. The data space index is changed as shown in FIG. 5 110 wherein the numbering is consistent with FIG. 3. Node 114 now contains no text, but instead points to node 124 which contains both the keys bark and chirp.

The data space change is journaled so that the journal now contains:

| 16 | *same as before* |
|---|---|
| 17 | *same as before* |
| 18 | *same as before* |
| 19 | *same as before* |
| 20 | *same as before* |
| 21 | *same as before* |
| 22 | Data space entry type, data space address, ordinal number 6 "dog bark" |

The journal force point is just prior to entry number 21, so entries 21 and 22 now are written to auxiliary storage when entry is made. The pin is then pulled from page 1, and the data space now contains:

| ordinal number | field 1 | field 2 |
|---|---|---|
| 1 | cow | moo |
| 2 | sparrow | chirp |
| 3 | horse | whinney |
| 4 | cat | meow |
| 5 | duck | quack |
| 6 | dog | bark |

Now the entry "bird titter" will be made. Although page 2 of the index will change, its corresponding bit is on in the bit map so nothing need be journaled or pinned for it. The bit map need not be updated since the bit is already on. Since the page was not pinned, nothing is put on the pinned page list. The data space index is changed and the data space change is journaled. The journal now contains:

| 16 | *same as before* |
|---|---|
| . | . |
| . | . |
| . | . |
| 22 | |
| 23 | data space entry type, data space address, ordinal number 7 "birds titter" |

The journal entry 23 is written to auxiliary storage. No pins need be pulled, and the data space is then changed. The data space now contains:

| ordinal number | field 1 | field 2 |
|---|---|---|
| 1 | cow | moo |
| 2 | sparrow | chirp |
| 3 | horse | whinney |
| 4 | cat | meow |
| 5 | duck | quack |
| 6 | dog | bark |
| 7 | birds | titter |

One alternative to the pinning mechanism described is to use an ordered I/O scheme. Pinning is used to insure that the changed index page does not get written to disk ahead of the journal image of the page's virgin image. Alternatively, a storage management function may be used to specify an order of page writes. In this case, the journal image, then the changed index page would be written.

INDEX RESILIENCY CIRCULAR BUFFER

A further embodiment of this invention uses a circular buffer logging area for index virgin pages instead of depositing them on the journal being used to deposit the data space entry images. The algorithm requires that the data space changes be journaled, but the index virgin pages be written to a circular buffer separate from the journal associated with the data space. This circular buffer concept reduces the amount of auxiliary storage required to house the index virgin pages and eliminates the journal being bloated with many index virgin pages.

Figure 8:
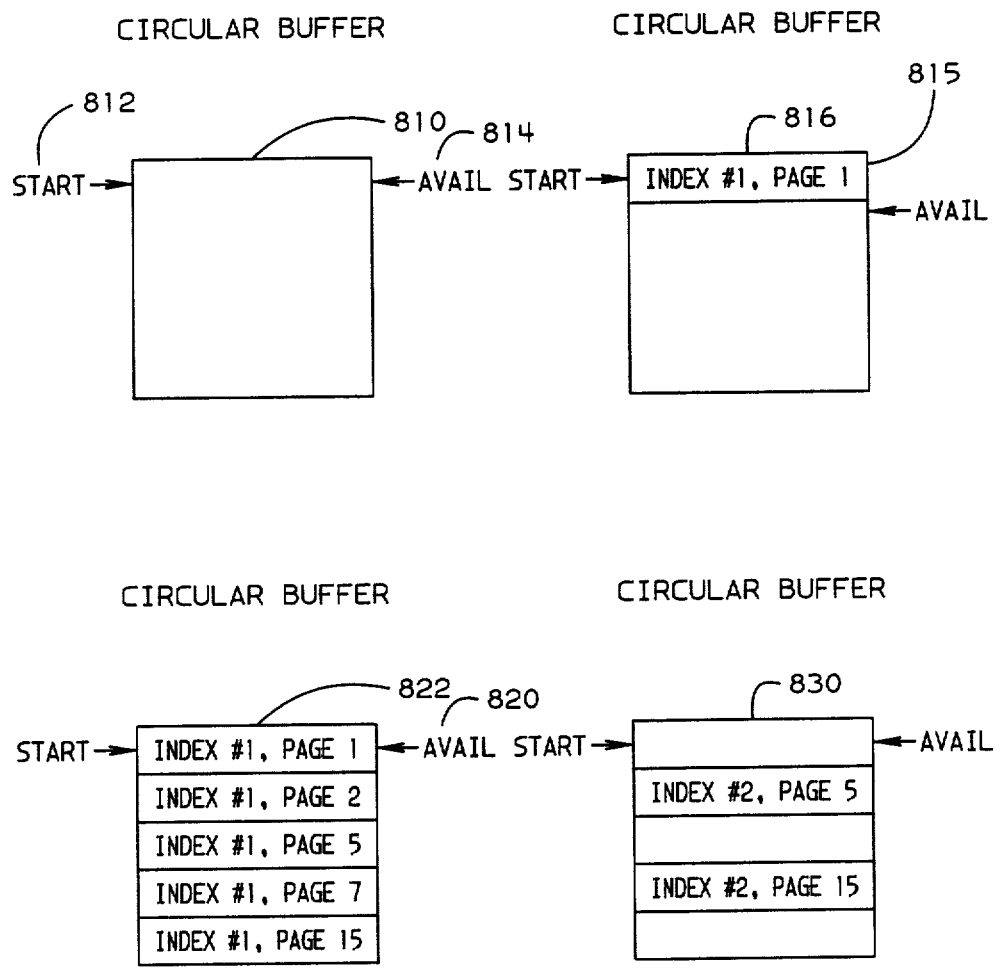
FIG. 8 is a diagram of sequential states of an alternative circular buffer for storing virgin page images from journaled logical files.

A circular buffer at 810 in FIG. 8, to house index virgin pages is defined and referenced by two pointers, START, indicated at 812 and AVAIL, indicated at 814 which identify the area first used and the next available area in the buffer respectively. A bit map is also defined which identifies each virgin page of the index file which has already been deposited in the circular buffer. Since the virgin pages of the index are written to the circular buffer 810, once a virgin is in the buffer it need not be deposited in the buffer again unless the index is completely written to auxiliary storage and a new sync point is indicated in the journal. There is a distinct bit map for each index but the circular buffer could be used to deposit virgin pages from multiple indexes on a system.

As the data spaces are changed, changes may be triggered in any indexes over these data spaces. Once the pages of the index to be modified are determined, the bit map for the index is inspected to see if the virgin images of any of these pages have already been deposited in the circular buffer. If the virgin page has been deposited then no further action is necessary and that index page is modified. If the virgin page has not been deposited then it is deposited to the circular buffer and an asynchronous write (page written to auxiliary storage) is initiated on the new deposit. The virgin page in the index is then pinned and modified. The pin remains on the modified index page until the deposit of the virgin page in the circular buffer has been written to auxiliary storage. This order must be followed so recovery has the necessary information to replace the modified index page with the original virgin page. Once the buffer is written to auxiliary storage, the real index page can be unpinned and is allowed to again participate in normal paging activity.

The key to the circular buffer journal algorithm is the management of the circular buffer. To illustrate this, an example will be presented in which changes to two indexes occur concurrently.

Initially the buffer is empty but allocated to an implementation dependent size. START at 812 and AVAIL at 814 both reference the first byte of the allocated space. A data space entry change causes page 1 of index #1 at 815 to be changed (as indicated in FIG. 8). The view of the circular buffer after the change is shown at 816. START, at 818 will remain positioned at the beginning of the buffer but AVAIL 820 moves forward in the buffer as the virgin index page is deposited to the buffer. The newly used buffer space for the page is now written to auxiliary storage asynchronously, the changed index page is pinned, and the actual changes are made. The appropriate bit map bit is set to indicate that the virgin of this index page is in the buffer.

The above process is repeated for pages 2 and 7 of index #1 and pages 5 and 15 of index #2. By the time page 7 of index #1 is written to the buffer the asynchronous writes of index #1 pages 1 and 2 have completed. Pages 1 and 2 in the index #1 are then unpinned in main memory. After pages 2, 7, 5, and 15 have been placed in the buffer AVAIL at 820 in the third view of the buffer (822) is now referencing the start of the buffer since it has reached the end of the initially allocated buffer space and "wrapped" back to the beginning of the buffer. This wrapping illustrates the circular nature of this buffer.

If any other changes occur on either index, space must be available in the circular buffer to house the virgin images. Since all the space has been used, an area must be freed before any other changes can be made. To accomplish this, the index whose pages are next in the buffer is written to auxiliary storage. This frees all the pages associated with that index since they are no longer required for recovery and causes the START pointer at 828 (in the fourth version of the buffer 830) to advance to the next used area.

It should be noted that the size of the buffer must be chosen such that forces of the indexes do not occur very often. However, if the buffer is too large, the recovery time can become unreasonable since many virgin pages must be applied to the index. A compromise between these two factors where both the number of run time writes to auxiliary storage and the recovery time are acceptable, is necessary. The user is given an option to select the buffer size.

If recovery becomes necessary, the indexes are restored to their virgin state by reading the circular buffer beginning at START and ending at AVAIL and replacing the index pages with their virgin images as they exist in the circular buffer. After this is complete the index appears as it did before the last force. The journal is then inspected and the changes to the data spaces are made with changes also applied to the indexes as appropriate. Since the indexes are in their virgin state the changes can be made directly to the indexes. Once the journal is applied, the data base network is ready to be used with no further processing.

Figure 9:
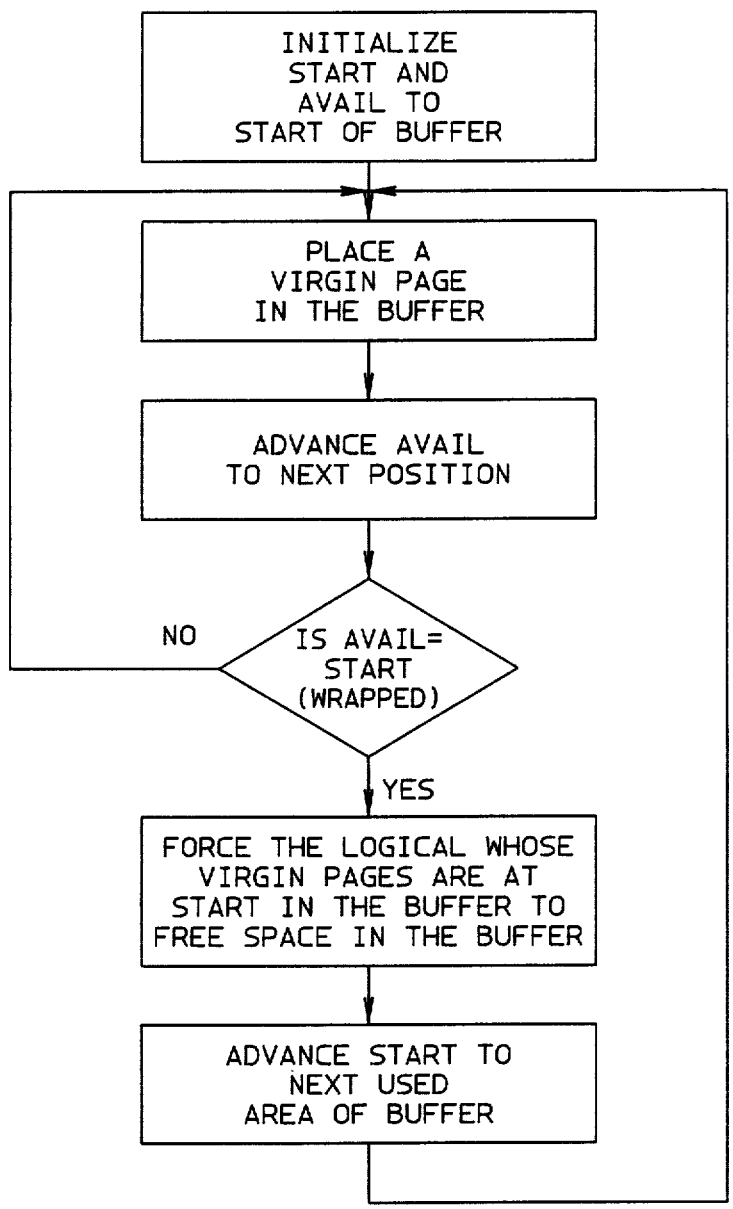
FIG. 9 is a flow diagram for depositing virgin index images in the circular buffer.

FIG. 9 illustrates the basic procedure used to deposit virgin images in the circular buffer.

While the invention has been described in terms of one embodiment with a few variations also described, it is recognized by those skilled in the art that the invention is not limited to such embodiment and variations. The invention applies to journaling logical files, not just indexes. There are a number of different storage management mechanisms which could be substituted without departing from the spirit scope of the invention as described and claimed.

What is claimed is:

1. A method of journaling indexes relating to data spaces comprising the steps of:
   a. journaling to a journal unchanged pages of indexes which have changes as a result of the changes to be made to a data space so that the indexes are synchronized with the data space at a desired point in the journal; and
   b. journaling changes to the data space prior to changing the data space.

2. A method of journaling indexes relating to a data space in a computer system which pages data to and from a main storage and auxiliary storage, the method comprising the steps of:
   a. determining which index pages require changing as a function of requested data space changes;
   b. pinning such index pages to prevent them from being written to auxiliary storage;
   c. journaling to a journal unchanged pages of indexes which have changes as a result of the changes to be made to the data space so that the indexes are synchronized with the data space at a desired point in the journal;
   d. changing said indexes;
   e. journaling changes to the data space prior to changing the data space;
   f. writing the journal to auxiliary storage;
   g. unpinning the index pages so that they may float to auxiliary storage; and
   h. changing the data space.

3. A journaling device for a computer system utilizing paging between a main storage and auxiliary storage, the computer system having data spaces and indexes relating to said data spaces, the journaling device comprising:
   storage means for storing journaling information;
   data space journaling means coupled to the storage means for journaling information relating to changes to be made to data spaces to the storage means; and
   index journaling means coupled to the storage means for journaling unchanged pages of indexes affected by the changes to be made to a data space to the storage means such that the storage means contains information from which the data space and indexes are recoverable to a same point in time.

4. The journaling device of claim 3 wherein the storage means comprises a nonvolatile storage device.

5. The journaling device of claim 4 wherein the journaling information for both the data space and the unchanged index pages relating thereto are transferred together to the nonvolatile storage device.

6. The journaling device of claim 4 wherein the journaling information is written to the nonvolatile storage device prior to permanent changes being made to the auxiliary storage image of both the data space and index.

7. The journaling device of claim 4 wherein the storage means further comprises an area in main storage, and wherein index pages which have been journaled in main storage but have not been written to nonvolatile storage are pinned to prevent changes to them from being written to auxiliary storage.

8. The journaling device of claim 3 and further comprising recovery means coupled to the storage means for rolling back the indexes relating to a data space following a system failure and using the data space journaled information to effect changes to the rolled back indexes to synchronize them with the data space.

9. The journaling device of claim 3 and further comprising:

detecting means coupled to the index journaling means for detecting index pages affected by the changes to be made to a data space.

10. The journaling device of claim 9 and further comprising:
cloning means coupled to the index journaling means for copying all the unchanged pages in the index to auxiliary storage when the detecting means determines that a predetermined ratio of pages in the index will be changed.

11. The journaling device of claim 10 wherein the index journaling means journals an indication that a copy of an index has been made, said indication identifying the storage means location of said copy.

12. The journaling device of claim 3 wherein the storage means comprises a circular buffer on auxiliary storage which removes journaled information no longer needed for recovery.

13. The journaling device of claim 3 wherein sync points are generated and stored in the storage means by at least one of the data space and index journaling means, said sync points being representative of the journaling information having been written to a nonvolatile storage.

14. The journaling device of claim 13 wherein data space journal information has a sync point separable from the sync point corresponding to the index pages which have been journaled.

* * * * *